United States Patent [19]

Marui

[11] Patent Number: 4,964,192

[45] Date of Patent: Oct. 23, 1990

[54] MULTIPLE RADIUS GRIP

[75] Inventor: Shinji Marui, Kobe, Japan

[73] Assignee: Marui, Ltd., Kobe, Japan

[21] Appl. No.: 342,489

[22] Filed: Apr. 24, 1989

[51] Int. Cl.$^5$ ............................................ B62K 23/00
[52] U.S. Cl. ............................... 16/111 R; 16/114 R; 16/116 R; 16/DIG. 12; 16/DIG. 19; 74/551.9; 273/75; 273/81.4; D8/303; 81/489
[58] Field of Search ............. 16/111 A, 111 R, 114 R, 16/116 R, DIG. 12, DIG. 18, DIG. 19; 74/551.9; 273/75, 81 R, 81.4, 81.6, 81 B, 81.2; D8/303, 310, 313, 314, 315, DIG. 8; 81/489

[56] References Cited

U.S. PATENT DOCUMENTS

| | | | |
|---|---|---|---|
| 144,446 | 4/1946 | Black . | |
| D. 191,751 | 11/1961 | Woodall, Jr. | D8/303 |
| D. 248,616 | 7/1978 | Johnson | D8/303 |
| D. 273,935 | 5/1984 | Bolster et al. | D8/303 |
| D. 300,506 | 4/1989 | Pedone | D8/303 |
| 2,425,245 | 8/1947 | Johnson . | |
| 2,466,719 | 4/1949 | MacKearnin | 16/116 R |
| 2,716,559 | 8/1955 | Boyce | 16/111 A |
| 2,877,018 | 3/1959 | Turner | 273/81 B |
| 4,186,924 | 2/1980 | Southey | 273/81.4 |
| 4,380,093 | 4/1983 | Morgan . | |
| 4,476,742 | 10/1984 | Midgley | 74/551.9 |
| 4,522,083 | 6/1985 | Morgan | D8/303 |
| 4,629,191 | 12/1986 | Mancuso | 273/81 B |
| 4,641,857 | 2/1987 | Gailiunas | 16/DIG. 12 |

FOREIGN PATENT DOCUMENTS 271547 10/1950 Switzerland .
219469 7/1924 United Kingdom .
414722 8/1934 United Kingdom .

OTHER PUBLICATIONS

Ad from "Bicycle Dealer Showcase", Aug. 1988.

*Primary Examiner*—Richard K. Seidel
*Assistant Examiner*—Edward A. Brown
*Attorney, Agent, or Firm*—Spensley Horn Jubas & Lubitz

[57] ABSTRACT

A cushioned grip having a unitary tubular-shaped body portion with an asymmetrical off-center cross-sectional shape. The asymmetrical off-center shape provides increased cushioning on portions thereof while retaining a moderate sized circumference. The asymmetrical cross-sectional shape provides a first portion having a first thickness of cushioning material, a second portion having a second lower thickness of cushioning material and a third portion of further reduced thickness of cushioning material. The third portion of cushioning is provided with a flat surface to provide a positive and solid feel to the fingers while grabbing the grip. The center's curvature defined by the outside of the cross-sectional shape of the grip is displaced from the center of the inside portion which is generally circular and adapted to receive a hard round member such as a bicycle handlebar to be cushioned. The cushioning thickness may vary from a relatively small value at one end of the grip to a maximum in a central region and reducing again to a smaller thickness at the other end to provide a varying circumference for different size hands.

15 Claims, 2 Drawing Sheets

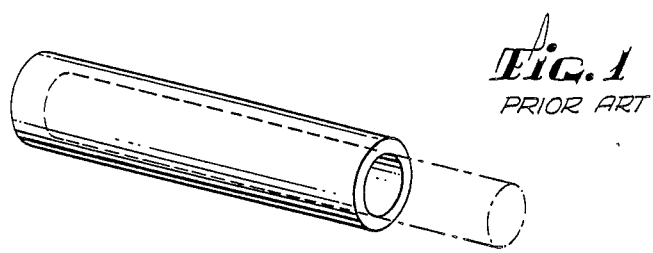
Fig. 1
PRIOR ART
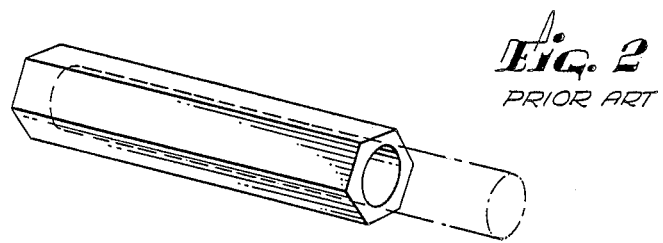
Fig. 2
PRIOR ART
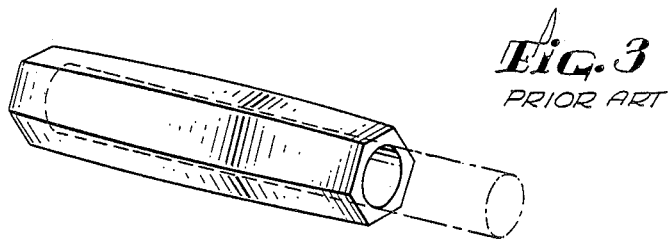
Fig. 3
PRIOR ART
Fig. 4
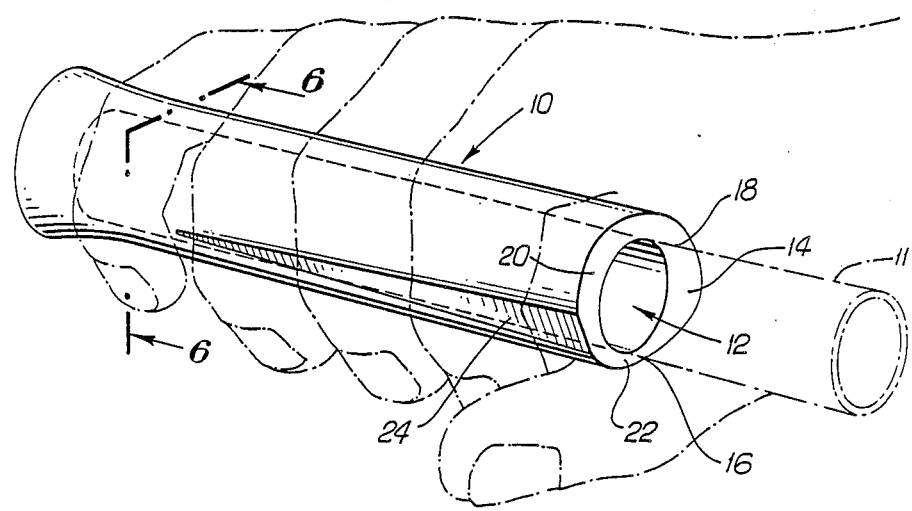

MULTIPLE RADIUS GRIP

BACKGROUND OF THE INVENTION

1. Field of the Invention

The present invention relates to cushioned hand grips. More particularly, the present invention relates to grips for cushioning tubular members such as handlebars for bicycles and motorcycles.

2. Description of The Prior Art and Related Information

Cushioned hand grips have typically been designed with simple symmetrical shapes For example, handlebar grips for bicycles have typically been designed with a simple tubular shape having a circular cross-section central opening which slips over the handlebar. Such a conventional tubular-shaped handlebar grip with a circular cross-section is illustrated in FIG. 1. Variations on the simple tubular-shaped grip with circular cross-section have also been employed in the prior art, such as, for example, grips with hexagon-shaped cross-sections such as illustrated in FIG 2.

Such prior art grip designs, while providing some cushioning and a reasonably secure grip, clearly present little reflection of anatomical considerations in their design. Some variations from the straight tubular approach have been provided in the prior art. For example, in FIG. 3 a grip design wherein the grip radius is increased in a central region along the length of the grip is illustrated. This design provides a somewhat improved design with respect to allowing varying size hands to grasp the grip firmly but does not fully reflect anatomical considerations.

The foregoing grips have proved suitable for applications requiring only moderate cushioning combined with control, such as typical bicycle applications. In applications involving significant shock absorption through the grip while maintaining positive control with the grip, however, such prior art grips have not been fully adequate. For example, the advent of off-road bicycles and motorcycles has introduced new considerations in bicycle and motorcycle grip designs. In particular, the off-road environment introduces considerable shock into the handlebars of the bicycle or motorcycle not normally experienced in more conventional on-road riding. Thus, for a lightly padded symmetrical handlebar grip design, the shock will be transmitted directly into the riders arms and over prolonged periods of offroad cycling can cause significant discomfort and even injury due to the vibration. Manufacturers have generally responded to this increased shock experienced in off-road cycling by simply increasing the thickness of the padding of the bicycle or motorcycle grips or by changing the cushioning quality of the material. However, the former approach has made the grips too large for people with smaller hands and the latter approach has added cost. Also, both approaches reduce the feeling of control and preciseness in the handlebar grip which is important in competitive off-road cycling or other demanding situations. Furthermore, both approaches reduce the power which can be applied through pulling on the handlebars typically used during competitive bicycle riding or steep climbing bicycling activities.

Accordingly, prior art grips do not presently provide the combination of cushioning and control needed for more demanding applications. In particular, a need presently exists for a grip suitable for the demanding requirements of off-road bicycling and motorcycling including shock insulation, precise and positive handlebar control, good power transmission, comfort, and the ability to accommodate varying hand sizes.

SUMMARY OF THE INVENTION

The present invention provides an improved grip for tubular members, such as bicycle handlebars, which provides improved shock absorption characteristics.

The present invention further provides an improved grip providing positive and precise control.

In a preferred embodiment, the present invention provides a generally tubular-shaped unitary grip combining an asymmetrical cross-section with an off-center opening. More particularly, the grip of the present invention in cross-section has a circular opening for receiving a hard tubular member, such as a metal bicycle handlebar. The cushioning of the grip is provided by a body portion having in cross-section, varying thickness surrounding the central circular opening. The center of the circular opening is off-set from the center of the body portion. Three separate thickness regions are defined on the body portion, including a first region configured, for example, so as to face the cycle rider when configured on a cycle handlebar. The first portion has a maximum thickness and thereby provides a maximum cushioning and shock absorption capability. A second portion of the cross-section of the grip has a thickness less than the first portion. This portion is configured so as to be on top of a cycle handlebar so as to receive the weight from the cycle riders hands during upright riding. The third portion of the cross-sectional shape of the grip is thinner than both the first and second portions. The third portion has a configuration such that if the grip is mounted on a cycle's handlebars the third portion will receive the fingers of the bicycle rider when grabbing the grip in a natural fashion. This third portion is preferably substantially flat relative to the inside circular region and is sufficiently thin to allow a positive solid feeling to the bicycle grip when grasped by the cycle rider's fingers. The three separate portions of the cross-sectional shape of the grip may preferably be smoothly varied into each other so as to form an overall off-center flattened elliptical shape. Alternatively, the three-way varying thickness grip may be combined with a seven sided shape, or other flat sided shape.

The present invention may optionally further provide a varying thickness grip along the lengthwise direction of the generally tubular shaped grip. Preferably all three portions of the annular cross-sectional shaped grip will have a reduced thickness at each lengthwise end of the tubular shaped grip. The resulting bulge shape central portion in conjunction with the three-way varying annular cross-sectional shape will thus provide an anatomically natural feeling of grip wherein the rider may choose the most comfortable feeling position along the length of the grip to find a position where the hand comfortably encircles the grip.

BRIEF DESCRIPTION OF THE DRAWINGS

FIG. 1 is a perspective view of a simple tubular prior art bicycle grip.

FIG. 2 is a perspective view of prior art bicycle grip having a hexagonal cross-sectional shape.

FIG. 3 is a perspective view of a prior art bicycle grip having a slightly bulged central portion FIG. 4 is a perspective view of a preferred embodiment of the improved grip of the present invention.

DESCRIPTION OF THE PREFERRED EMBODIMENT

Figure 5:
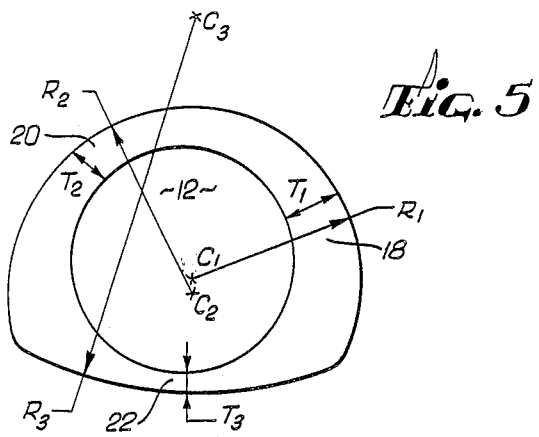
FIG. 5 is a cross-sectional drawing of an illustrative embodiment of the improved grip of the present invention.

Referring to FIG. 4, a preferred embodiment of the improved bicycle grip of the present invention is illustrated in a perspective view. As may be seen from FIG. 4, the grip 10 has a generally tubular shape suitable for cushioning a hard tubular bar 11. The grip 10 has an elongated direction corresponding to that of bar 11, and a circular central opening 12 of radius suitable for receiving the metal tubular bar 11. The grip as illustrated in FIG. 4 is oriented so that if slipped onto the handlebar tubing of a cycle, the cycle rider would naturally grasp the grip as illustrated.

As illustrated in FIG. 4, the grip design of the present invention has an asymmetrically varying body portion 14 varying annularly about the central opening 12. The body portion 14 of the grip 10 is preferably chosen of a suitable flexible but strong cushioning material. For example, Neo-45 neoprine or polyvinyl nitrate material may suitably be employed. It will be appreciated, however, that a wide variety of rubberized, foam or plastic or any cushioning materials may also suffice for suitable grips depending on the cost considerations and the demands to be placed on the cycle by the rider. Additionally, other cushioning designs such as employing one or more pockets of cushioning substance within body portion 14 may also be employed. For example, an additional tubular sectional body portion may be employed to enclose air, gel or other cushioning substance. Also, although the grip is preferably a single unitary piece of such flexible cushioning material, it is also possible to provide the body of the grip 14 with a segmented, flanged, or piecewise cushioning construction.

Figure 6:
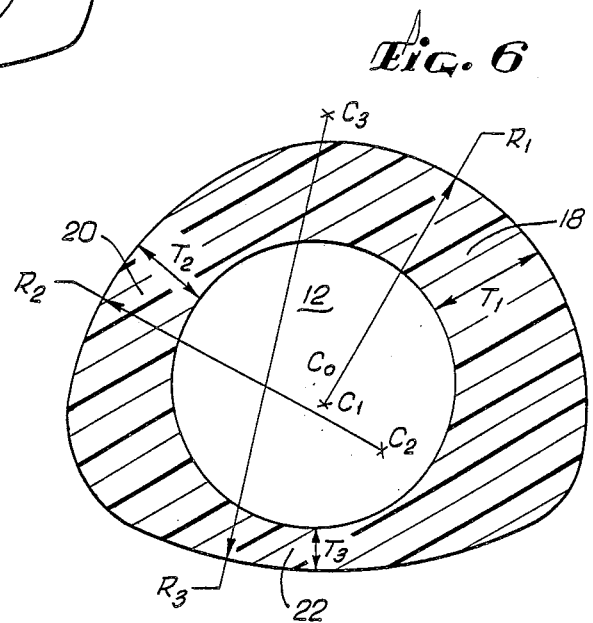
FIG. 6 is a cross-sectional drawing of a preferred embodiment of the grip of the present invention.

As may be seen in FIG. 4, and shown in more detail in FIGS. 5 and 6, the body portion of the grip 14 has an asymmetrical cross-sectional shaped about the circular opening 12. This asymmetrical shaped cross-section of the annular body region 14 may be characterized as an asymmetrical generally elliptical shape having a flattened bottom portion 16. It will further be appreciated from inspection of FIG. 4 that the annular body portion 14 has generally three distinct thickness portions 18, 20, and 22. First, thickness portion 18 has the thickest cushioning and is configured relative to the cycle rider so as to face, the cycle rider when in a normal seated riding position. Second thickness portion 20 has a reduced thickness from first portion 18, however, still supplies substantial cushioning since during upright riding such as during hill climbing or sprinting the rider will put substantial weight on this portion of the grip as well. Third portion 22 extends from the portion of the grip facing away from the rider around through the bottom of the handlebar. Third region 22 is substantially thinner than first and second regions 18 and 20 since relatively little shock is transmitted from the handlebar through this region. Additionally, the combination of the thinner cushioning through portion 22 and the flattened section 16 forming part of the third portion 22 provides a feeling of preciseness and positive control to the fingers which will grab this portion of the grip. Additionally, a flattened portion 24 may be provided on part of second portion 20 of the grip. The index and middle fingers will rest in this flattened portion 24 to further enhance the feeling of preciseness of the grip. As may be seen from FIG. 4, first, second and third portions 18, 20 and 22 will each comprise roughly one third of the circumference of the grip.

It will be readily appreciated from inspection of FIG. 4 that the grip configuration of the present invention provides a significant amount of cushioning in the area of the grip which receives the greatest force in shock during typical cycling riding, i.e., first portion 18, while providing a reduced overall circumference. Additionally, and significantly for competitive riding situations, second portion 20 provides significant cushioning for upright riding commonly used in competitive mountain bike or motorcycle racing situations. Finally, third region 22 provides a precise positive feeling to the cycle rider giving the control needed for competitive riding or other demanding cycling conditions. Also, as is frequently necessary in competitive bicycle riding, the rider may pull strongly on the handlebar grip to gain power, for example, in climbing and/or sprinting and this reduced profile through portion 22 provides increased power input from the rider when the grip is pulled. Finally, the small thickness portion 22 may optionally be combined with a longitudinally varying cross-sectional shape from a central larger circumference region to smaller circumference end portions to provide the smaller handed person a comfortable grip while receiving the benefits of the cushioning noted above.

Referring to FIG. 5, the present invention is illustrated in a cross-sectional view of the grip showing the various thicknesses of the first portion 18, second portion 20 and third portion 22. First portion 18 may be characterized by a first thickness T1 and a first outside radius of curvature R1 about a center of curvature C1. Second portion 20 is characterized by a second thickness T2 and a second radius of curvature R2. Third portion 22 in turn is characterized by a third thickness T3 and third radius of curvature R3 about a center of curvature C3. It will be appreciated from FIG. 5 that of each of the three centers of curvature C1, C2 and C3 at least two are off-set from one another. Also at least one of C1 and C2, as well as C3, is offset from the center C0 of the central opening 12. The values of these parameters will vary widely with the specific application, size of hand, e.g., adult or child, etc. However, general ratios between these parameters are preferably maintained.

FIG. 6 corresponds to a preferred embodiment with regions 18, 20 and 22 continuously varying into each other. Preferred values of R1, T1, R2, T2 and R3, T3 for a bicycle grip are listed in Table 1. These values assume a central opening of 22.2 mm diameter and take into account the typical dimensions of an adult human hand while providing an adequate amount of cushioning for off-road cycling. The ratio of T1 to T3 is thus approximately 2.5 to 1 (2.758 to 1) and T1 to T2 is 1.5 to 1 (1.429 to 1). The ratios of R1 to R2 to R3 are 1 to 1.3–1.5 to 2.0.

The circumference of the grip for these values is 106.7 mm. It will be appreciated that this circumference for a conventional round grip would provide a constant thickness of cushioning of 5.9 mm. Thus, with the same circumference the present invention provides approximately a 35% increase in cushioning thickness in region 18 while having reduced thickness in region 22 for increased control.

TABLE 1

| T1 | R1 | T2 | R2 | T3 | R3 |
|---|---|---|---|---|---|
| 8 mm | 17 mm | 5.6 mm | 22 mm | 2.9 mm | 35 mm |

As may be appreciated from FIGS. 4, 5 and 6, the grip of the present invention provides a relatively natural anatomical configuration which provides a secure grasp and a positive feel for various size hands.

Figure 7:
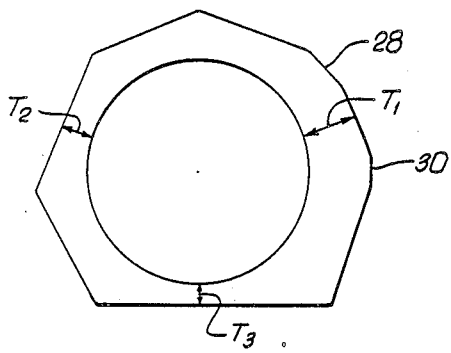
FIG. 7 is a cross-sectional view of an alternate embodiment of the grip of the present invention employing a seven-sided cross-sectional shape.
Figure 8:
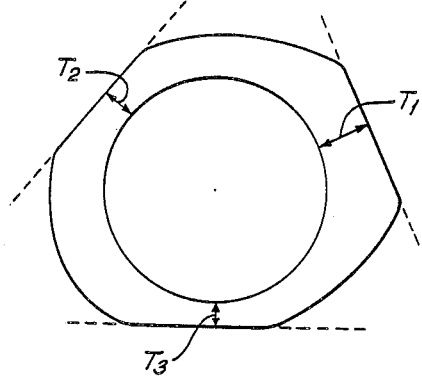
FIG. 8 is a cross-sectional view of an alternate embodiment of the grip of the present invention employing a three-sided flat cross-sectional shape smoothly connected by curved portions.

Referring to FIG. 7, an alternate embodiment is illustrated where the cross-sectional regions are defined with seven straight edge portions. The heptagonal cross-sectional shaped embodiment of FIG. 7 will preferably have the same asymmetrical cushioning as in the embodiment of FIGS. 4 and 5. However, to implement the desired asymmetric cushioning in the flat edged design, a deviation from a strict heptagonal cross-sectional shape will be necessary. Additionally, the edges are preferably beveled lengthwise along the grip at least at regions 28 and 30 to remove sharp edges at the points of maximum cushioning and highest pressure during normal riding. It will be appreciated that other numbers of straight edged sides may also be employed. For example, FIG. 8 illustrates an embodiment having three sides.

While the foregoing description of the present invention has included specific choices of size, configuration and relative dimensioning to describe a preferred embodiment thereof, it will be appreciated by those of ordinary skill in the art that substantial modifications and variations are possible while remaining within the spirit and scope of the present invention. Accordingly, the present invention should not be limited to the preferred embodiments described above.

What is claimed is:

1. A grip for cushioning a hard member adapted to be firmly grasped by a human hand, comprising:
   a generally tubular-shaped body portion having a cylindrical central opening of size and cross-sectional shape suitable to be slidably mounted onto the hard member in a length direction, the body portion having an asymmetrical cross-sectional shape perpendicular to said length direction and having first, second and third portions each defining a portion of a generally elliptical shape and having a center off-set from the center of the central opening, the outside perimeter of the body portion having a flattened shape on at least one side thereof.

2. A grip as set out in claim 1, wherein the first portion has a first minimum thickness and a first radius of curvature, the second portion has a second minimum thickness and a second radius of curvature, and the third portion has a third minimum thickness and a third radius of curvature; and
   wherein said first minimum thickness is greater than said second minimum thickness and said second minimum thickness is greater than said third minimum thickness.

3. A grip as set out in claim 2 wherein the grip extends in a length direction and has a first and second end in said length direction and wherein said first minimum thickness and said second minimum thickness increase from the first end of said tubular shaped grip towards the center thereof and then decrease again toward the second end of the grip.

4. A grip as set out in claim 2 wherein said first, second and third minimum thicknesses remain constant along the length of the unitary tubular shaped grip.

5. A grip as set out in claim 2, wherein the ratio of the first minimum thickness to the second minimum thickness is 1.5 to 1.

6. A grip as set out in claim 2 wherein the ratio of the first minimum thickness to the third minimum thickness is 2.5 to 1.

7. A grip as set forth in claim 2 wherein the ratio of the first radius of curvature to the second radius of curvature to the third radius of curvature is approximately 1 to 1.3–1.5 to 2.0.

8. A grip comprising a unitary tubular shaped member having a cross-sectional shape with a central opening configured so as to slidably receive a round cross-sectional handlebar therethrough, and having an asymmetrical annular-shaped body portion configured about said central opening, the outer perimeter of said annular shaped body portion having a multi-sided straight-edged shape thereby defining first, second, third, fourth, fifth, sixth and seventh surfaces on the outside surface of said grip, each of said surfaces having a minimum radial distance from the center of said opening, wherein at least three of said minimum radial distances are unequal.

9. A grip as set out in claim 8 wherein each of said minimum radial distances vary along the length of said tubular shaped grip from a minimum value at the ends thereof to a maximum value in a central portion along the length of the grip.

10. A grip as set out in claim 8 wherein said straight edge defining said seventh surface is longer than that of said first, second, third and fifth surfaces.

11. A grip as set out in claim 8 wherein said minimum radial distances of said first and second surfaces are equal, said minimum radial distances of said third, fourth and said fifth surfaces are equal, and said minimum radial distances of said sixth and seventh surfaces are equal.

12. A grip as set out in claim 1 wherein the grip extends in a length direction and has a first and second end in said length direction and wherein the outside perimeter has a flattened flange portion of size which varies along said length direction.

13. A grip as set out in claim 1 wherein the grip extends in a length direction and wherein the grip has a circumference which varies along said length direction.

14. A grip as set out in claim 13, wherein said cross-sectional shape is constant along said length direction.

15. A grip as set out in claim 2 wherein said grip extends in a lengthwise direction and wherein at least one of said first thickness, second thickness, and third thickness varies in said length direction.

* * * * *